(No Model.) 2 Sheets—Sheet 1.

Z. FOSTER.
AUXILIARY TIRE.

No. 554,922. Patented Feb. 18, 1896.

WITNESSES:
William P. Gaebel
Isaac R. Owens

INVENTOR
Z. Foster
BY Munn & Co
ATTORNEYS.

(No Model.) 2 Sheets—Sheet 2.
Z. FOSTER.
AUXILIARY TIRE.
No. 554,922. Patented Feb. 18, 1896.
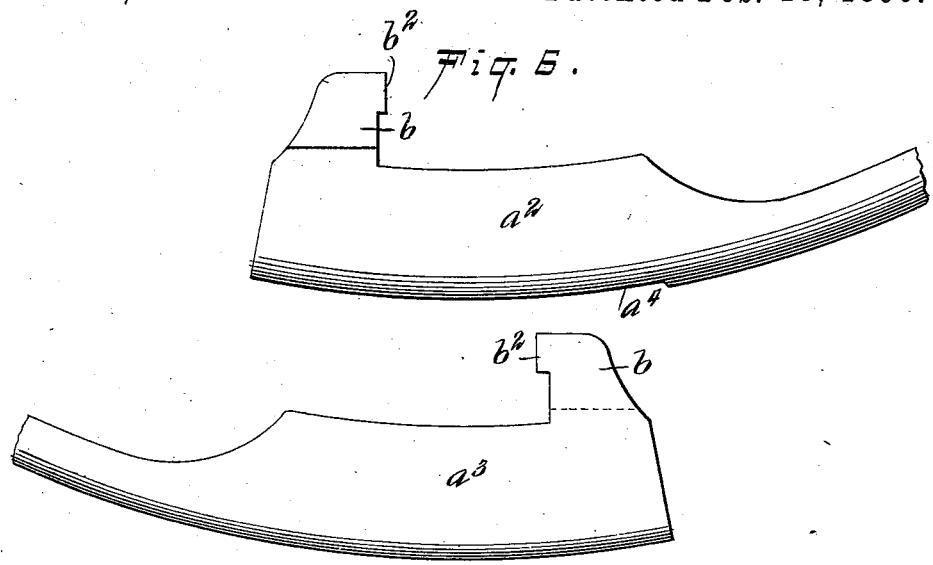
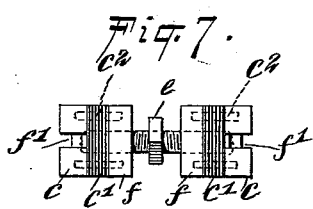
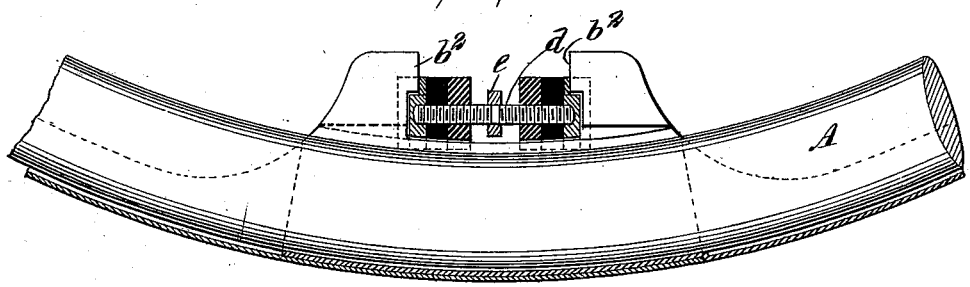
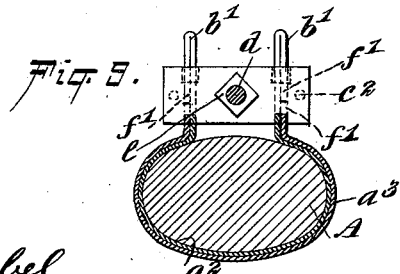
WITNESSES:
William P. Goebel.
Isaac B. Owens.
INVENTOR
Z. Foster
BY
Munn & Co
ATTORNEYS.

UNITED STATES PATENT OFFICE.

ZEBULON FOSTER, OF CHICAGO, ILLINOIS.

AUXILIARY TIRE.

SPECIFICATION forming part of Letters Patent No. 554,922, dated February 18, 1896.

Application filed August 31, 1895. Serial No. 561,116. (No model.)

*To all whom it may concern:*

Be it known that I, ZEBULON FOSTER, of Chicago, in the county of Cook and State of Illinois, have invented certain new and useful Improvements in Auxiliary Tires, of which the following is a full, clear, and exact description.

The object of this invention is to provide a protector for pneumatic and other tires, so that they will be prevented from puncture and other injury.

To this end the invention consists in certain peculiar features of construction and combinations of parts, as will be fully described hereinafter, and finally embodied in the claims.

Reference is to be had to the accompanying drawings, forming a part of this specification, in which similar characters of reference indicate corresponding parts in all the figures.

Figure 1:
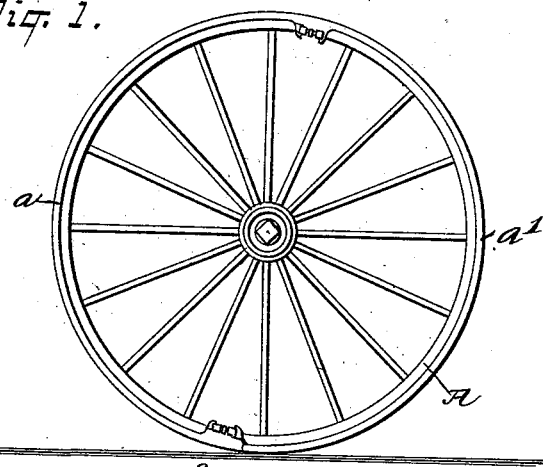
Figure 2:
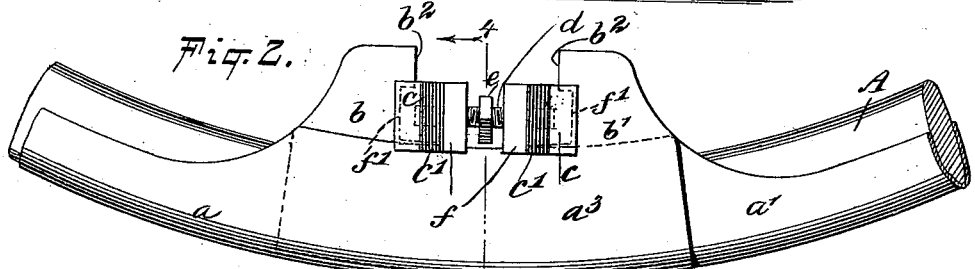
Figure 3:
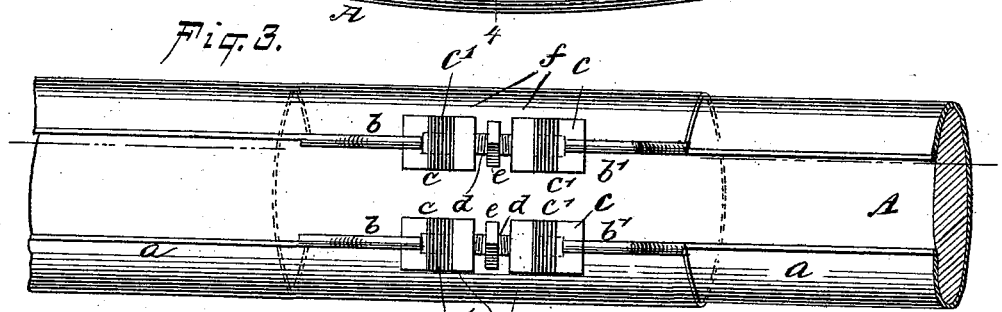
Figure 4:
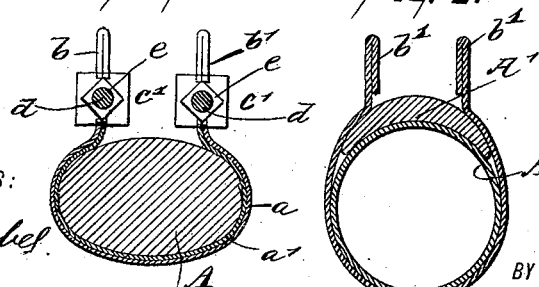
Figure 5:
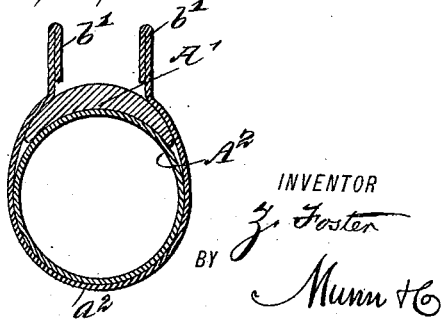

Figure 1 is a side elevation of a wheel provided with my improvements. Fig. 2 is an enlarged side elevation of the improvement. Fig. 3 is a plan view of the same and on an enlarged scale. Fig. 4 is a sectional view on the line 4 4 of Fig. 2. Fig. 5 is a cross-section showing my improvement applied to a different form of tire. Fig. 6 is a dissociated view of the contiguous ends of the protector. Fig. 7 is a plan view of one of the tightening-bolts and their nuts, showing the same disconnected from the other parts. Fig. 8 is a detail section taken through the same, and Fig. 9 is a sectional view illustrating a modification.

Referring to Figs. 1, 2, 3, 4, 6, 7 and 8, the tire A is provided with a protective rim, which, in Fig. 1, is shown to be formed of two sections $a$ and $a'$, though this is not essential, for the tire may be formed of an integral piece of material. The contiguous ends of the rim are each formed with enlargements $a^2$ and $a^3$, and the end $a^2$ is formed with a slightly-reduced portion $a^4$, which is adapted to fit into the end $a^3$, as shown best in Figs. 2, 3 and 8. Each of the ends $a^2$ and $a^3$ is formed with two upwardly-extending ears $b$ and $b'$, which have overhanging portions $b^2$ projecting inward. (See Figs. 2, 6 and 8.) It will be seen that when these ends are received one within the other the ears $b$ and $b'$ are opposite each other, so that the rim may be tightened by moving the ends apart. This tightening is effected by means of the threaded shafts $d$, which have at their middles heads $e$, by which they are operated, the threads of the shafts being oppositely disposed on each side of the heads.

Receiving each end of the shafts $d$ are compound nuts, each of which comprises three sections, the outer section, $c$, being directly contiguous to a central section, $c'$, which is formed of rubber or other resilient material and which has the inner section, $f$, bearing against its inner side, said inner section being of metal. The three sections of the nuts are joined to each other by means of dowel-pins $c^2$, which hold them from independent rotary movement, but make them capable of slight longitudinal movement under the influence of the expansive sections $c'$. Each of the outer sections, $c$, is provided with a groove $f'$ in its end, which grooves are adapted to receive the inner edges of the ears $b$ and $b'$ and to have the overhanging portions $b^2$ lie in the upper horizontal arms of the grooves. It will thus be seen that by operating the shafts $d$ the nuts at each end thereof may be drawn toward and from the middle of the shafts, so as to push the ears $b^2$ away from each other and thus contract the rim, causing it to bind on the tire A.

In Fig. 5 I have shown my improvements applied to a tire composed of the wooden felly $A'$ and the pneumatic cushion $A^2$, around which the rim is passed, and the extremities $a^2$ and $a^3$ are arranged as in the other form and have ears $b$ and $b'$, all of which will be understood.

In the first eight figures of the drawings I have shown two of the threaded shafts $d$ for holding the ends of the tire, but by reference to Fig. 9 it will be seen that the compound nuts on said shafts may be elongated transversely, so as to extend from one of the ears $b$ and $b'$ to the other, thus making only one of the shafts $d$ necessary. To permit these transversely-elongated nuts to receive the ears, their end sections $c$ are each formed with two grooves $f'$, as Fig. 9 shows.

Having thus described my invention, I claim as new and desire to secure by Letters Patent—

1. A tire having a protective rim, the same having its contiguous ends enlarged and curved so as to extend inwardly around the sides of the tire and beyond the same, said contiguous ends lying one within the other and having their flat sides making snug contact with each other, each side of each end having an ear extended inwardly and beyond the tire a threaded bolt, and means for connecting said bolt to the ears to push them apart, substantially as described.

2. A tire having a protective rim, the same having its contiguous ends enlarged and curved around the sides of the tire and extended inwardly therefrom, the said ends being arranged one within the other and having their flat sides snugly engaged with each other, each side of each end having an inwardly-extended portion to form an ear, the ears of each end being longitudinally-aligned with those of the other, a nut engaging each ear, and two threaded bolts, the bolts being respectively engaged with each pair of longitudinally-aligned nuts, whereby the ears may be spread, substantially as described.

ZEBULON FOSTER.

Witnesses:
BENJ. E. WINSLOW,
ERNEST PITTMAN.